United States Patent
Chen et al.

(10) Patent No.: US 8,886,968 B2
(45) Date of Patent: Nov. 11, 2014

(54) METHOD AND DEVICE FOR CONTROLLING A DUAL-PROCESSOR SWITCH, AND TERMINAL ASSOCIATED WITH THE METHOD AND DEVICE

(75) Inventors: Hao Chen, Beijing (CN); Haifang Tan, Beijing (CN)

(73) Assignee: Lenovo (Beijing) Co., Ltd., Beijing (CN)

(*) Notice: Subject to any disclaimer, the term of this patent is extended or adjusted under 35 U.S.C. 154(b) by 239 days.

(21) Appl. No.: 13/148,654

(22) PCT Filed: May 11, 2010

(86) PCT No.: PCT/CN2010/072614
§ 371 (c)(1),
(2), (4) Date: Aug. 9, 2011

(87) PCT Pub. No.: WO2010/133142
PCT Pub. Date: Nov. 25, 2010

(65) Prior Publication Data
US 2012/0054508 A1 Mar. 1, 2012

(30) Foreign Application Priority Data
May 20, 2009 (CN) .......................... 2009 1 0084526

(51) Int. Cl.
*G06F 1/32* (2006.01)
*H04L 12/933* (2013.01)
*H04L 12/00* (2006.01)

(52) U.S. Cl.
CPC .............. *H04L 49/15* (2013.01); *G06F 1/3206* (2013.01); *G06F 1/3293* (2013.01); *Y02B 60/32* (2013.01); *H04L 12/00* (2013.01)
USPC ....................................................... 713/300

(58) Field of Classification Search
CPC ................................. H04L 49/15; H04L 12/00
USPC .......................................................... 713/300
See application file for complete search history.

(56) References Cited

U.S. PATENT DOCUMENTS
2003/0188077 A1 10/2003 Watts
2011/0302438 A1* 12/2011 Rosay .......................... 713/323

FOREIGN PATENT DOCUMENTS
CN 1801132 A 7/2006
EP 1533707 A2 5/2005

* cited by examiner

*Primary Examiner* — Mohammed Rehman
(74) *Attorney, Agent, or Firm* — Dentons US LLP

(57) ABSTRACT

A method, a device and a terminal for controlling dual-processor switch are disclosed in the present invention. The terminal may include an X86 processor system, an embedded processor system and a switch module connecting the X86 processor system with the embedded processor system. The switch module may be coupled to the peripheral device of the terminal. The method includes that the switch module is controlling the peripheral device by receiving a control signal from the X86 processor system, the switch module receiving a triggering signal for switching to the embedded processor system. The switch module wakes up the embedded processor system, switching to receive a control signal sent from the embedded processor system, and controlling the peripheral device by using the control signal from the embedded processor system. The method may enable the embedded processor system to control the peripheral device of the terminal individually through the switch module. Therefore, the embedded processor system may accomplish specific applications of the terminal without starting up the X86 processor system.

7 Claims, 5 Drawing Sheets

METHOD AND DEVICE FOR CONTROLLING A DUAL-PROCESSOR SWITCH, AND TERMINAL ASSOCIATED WITH THE METHOD AND DEVICE

CROSS-REFERENCE TO RELATED APPLICATIONS

This is a National Phase of International Application No. PCT/CN2010/072614 filed on May 11, 2010, which claims priority from Chinese Patent Application No. 200910084526.1, filed on May 20, 2009.

TECHNICAL FIELD

The present invention relates generally to communications, and in particular, to a method and device for controlling a dual-processor switch.

BACKGROUND ART

The current heterogeneous processor computing environment mainly refers to a terminal comprising dual processors, which normally, one of the dual processors is an X86 processor, and the other is an embedded processor (e.g., an ARM processor or a MIPS processor). The X86 processor normally having the characteristics of high speed and high power consumption are a common Windows operating system processor. Since the computing capability is superior than the embedded processor, peripheral devices such as a display, a USB (Universal Serial Bus) interface, a keyboard, a speaker, etc. of the terminal, usually are directly coupled to the X86 processor. The X86 processor controls a video system, an audio system, a storage system and a peripheral input-output system through the PC (Personal Computer) bus standard. However, since the embedded processor normally has the characteristics of low speed and low power consumption, which is a non general-purpose processor, when the X86 processor is in a sleep state, or when the terminal is in a lower power state, it requires the embedded processor to accomplish specific applications, such as internet surfing or media play, so as to conserve power saving and fast starting up an application.

Conventionally, a dual-processor architecture, because the embedded processor adopts its own bus standard, which is inconsistent with the PC bus standard adopted by X86, it may be challenging for the embedded processor to control the peripheral device of the terminal individually. Therefore, when specific applications are accomplished, it still requires the X86 processor to be in the awake state, that is, both of the processors need to be in working state simultaneously. It may be seen that when the X86 processor is in a sleep state or standby state while specific applications are processed, the X86 processor has to be awakened, which in turn may increase the power consumption of the terminal.

SUMMARY OF THE INVENTION

The present invention provides a method and device for controlling a dual-processor switch for overcoming the foregoing problem where it requires the start up of two processors when conducting specific applications, thereby causing an increase in the power consumption of the terminal. The present invention provides a method for controlling a dual-processor switch, applicable to a terminal including an X86 processor system and an embedded processor system. The terminal also includes a switch module coupled to the X86 processor system and the embedded processor system. The switch module is coupled to the peripheral device of the terminal. The method includes the switch module for receiving a triggering signal for switching to the embedded processor system when the switch module is controlling the peripheral device by receiving a control signal from the X86 processor system. The switch module wakes up the embedded processor system, and switches to receive a control signal sent from the embedded processor system, and controlling the peripheral device by using the control signal from the embedded processor system.

The invention also provides a device for controlling a dual-processor switch, applicable to a terminal including an X86 processor system and an embedded processor system. The switch module is coupled to the peripheral device of the terminal. The device includes a receiving unit that is configured for receiving a triggering signal for switching to the embedded processor system, when a switch unit is controlling the peripheral device by receiving a control signal from the X86 processor system. The switch unit configured for waking up the embedded processor system, switching to receive a control signal sent from the embedded processor system, and controlling the peripheral device by using the control signal from the embedded processor system.

The invention further provides a terminal, comprising an X86 processor system, an embedded processor system and a switch module. The switch module is coupled to a peripheral device of the terminal. The switch module configured for receiving a triggering signal for switching to the embedded processor system, waking up the embedded processor system, and switching to receive a control signal sent from the embedded processor system, and controlling the peripheral device by using the control signal from the embedded processor system, when controlling the peripheral device by receiving a control signal from the X86 processor system.

It may be seen from the technical solution provided by the present invention that the terminal of the embodiments of the present invention includes an X86 processor system, an embedded processor system and a switch module connecting the X86 processor system with the embedded processor system. The switch module is coupled to a peripheral device of the terminal, when the switch module is controlling the peripheral device by receiving a control signal from the X86 processor system. The switch module receives a triggering signal for switching to the embedded processor system. The switch module wakes up the embedded processor system, switches to receive a control signal sent from the embedded processor system, and controlling the peripheral device by using the control signal from the embedded processor system. The embodiments of the present invention enable the embedded processor system to control the peripheral device of the terminal individually through the switch module Therefore, the embedded processor system can accomplish specific applications of the terminal without starting up the X86 processor system, thereby saving the power consumption of the terminal. The switch control function of the terminal may be integrated into the switch module, which saves the design cost and the number of the devices of the terminal.

DETAILED DESCRIPTION

The present invention describes a method, device and terminal for controlling a dual-processor switch. The terminal includes an X86 processor system, an embedded processor system and a switch module connecting the X86 processor system with the embedded processor system. The switch module is coupled to a peripheral device of the terminal. When the switch module is controlling the peripheral device by receiving a control signal from the X86 processor system, the switch module receives a triggering signal for switching to the embedded processor system. The switch module wakes up the embedded processor system, switches to receive a control signal sent from the embedded processor system, and controls the peripheral device by using the control signal from the embedded processor system.

In order for one skilled in the art to understand the solution of the present invention better, and to make the above purposes, features and advantages of the invention more apparent, the following detailed description, which taken in conjunction with the annexed drawings and the certain embodiments of the invention is provided.

The terminal of the embodiments of the present invention includes an X86 processor system and an embedded processor system, both of which can control the peripheral device of the terminal individually through the switch module. The embedded processor system may be embodied as an ARM processor or a MIPS processor. The peripheral device of the terminal typically comprises a display, a USB peripheral device (a camera, a Bluetooth, a wireless network card, etc.), a flash memory or memory card interface, an audio device (a speaker, an earphone or a microphone). Between these electronic components, the embedded processor and the switch module may be set separately, or the embedded processor may be integrated into the switch module and coupled to the switch module through the internal bus. The switch module typically can integrate multiple chips with the function of the switch unit, or able to integrate multiple chips with the function of the switch unit and the function of the embedded processor.

Figure 1:
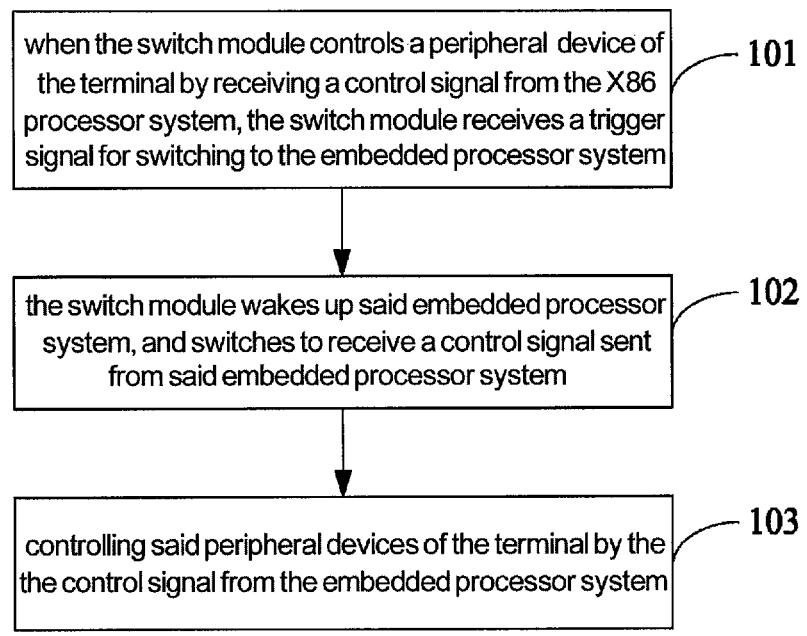
FIG. 1 is a flowchart of a method for controlling a dual-processor switch in the first embodiment of the present invention.

The flowchart of the method for controlling the dual-processor switch in the first embodiment of the present invention is shown as FIG. 1.

At step 101, when the switch module is controlling the peripheral device of the terminal by receiving a control signal from the X86 processor system, the switch module receives a triggering signal for switching to the embedded processor system.

The switch module may include a display switch unit coupled to the display module, a USB signal switch unit coupled to a USB peripheral device, a storage sharing switch unit coupled to a flash memory interface or a memory card interface, or an audio signal switch unit coupled to an audio device.

The switch module controls the peripheral device by receiving the control signal from the X86 processor system in at least one of the following ways: the display switch unit receives a display control signal sent by the X86 processor system through the display card and controls the display module; the USB signal switch unit receives a USB control signal sent by the X86 processor system through a south bridge and controls the USB peripheral device; the storage sharing switch unit receives a store control signal sent by the X86 processor system through the south bridge and controls the FLASH or the memory card interface; or the audio signal switch unit receives an audio control signal sent by the X86 processor system through a sound card and controls the audio device.

At step 102, the switch module wakes up the embedded processor system and switches to receive a control signal sent from the embedded processor system.

The switch module sends a wake-up signal through a SPI interface to the embedded processor system, and then the switch module obtains the current application data of the terminal, and generates a clock signal required for controlling display protocol conversion and storage sharing.

The operation that the switch module receives the triggering signal to switch to the embedded processor may include: when a switch button on the terminal is pressed, the switch module receives the triggering signal to switch to the embedded processor, which corresponds to the switch button; when the X86 processor system is in a sleep state or a standby state, the switch module receives a triggering signal to control the peripheral device through the embedded processor system; when the power level of the terminal is lower than a threshold value, the switch module receives a triggering signal to switch to the embedded processor system; or when the terminal starts up a specific application software, the switch module receives a triggering signal to switch to the embedded processor system.

At step 103, the control signal is used to control the peripheral device of the terminal from the embedded processor system.

The current different applications of the terminal are as follows—switching to receive the control signal sent from the embedded processor system at least comprises any one of the following: the display switch unit switches to receive the display control signal which has been display-protocol-converted sent from the embedded processor system; the USB signal switch unit switches to receive the USB control signal sent from the embedded processor system; the storage sharing switch unit switches to receive a storage control signal sent from the embedded processor system; and the audio signal switch unit switches to receive the audio control signal sent from the embedded processor system.

Furthermore, when the embedded processor system is integrated in the switch module, the switch module also includes a base band processing unit coupled to the bus. The terminal can also perform encoding and decoding on the wireless communication channel through the base band processing unit, and perform wireless communication with an antenna through a Radio Frequency unit coupled to the base band processing unit.

Figure 2:
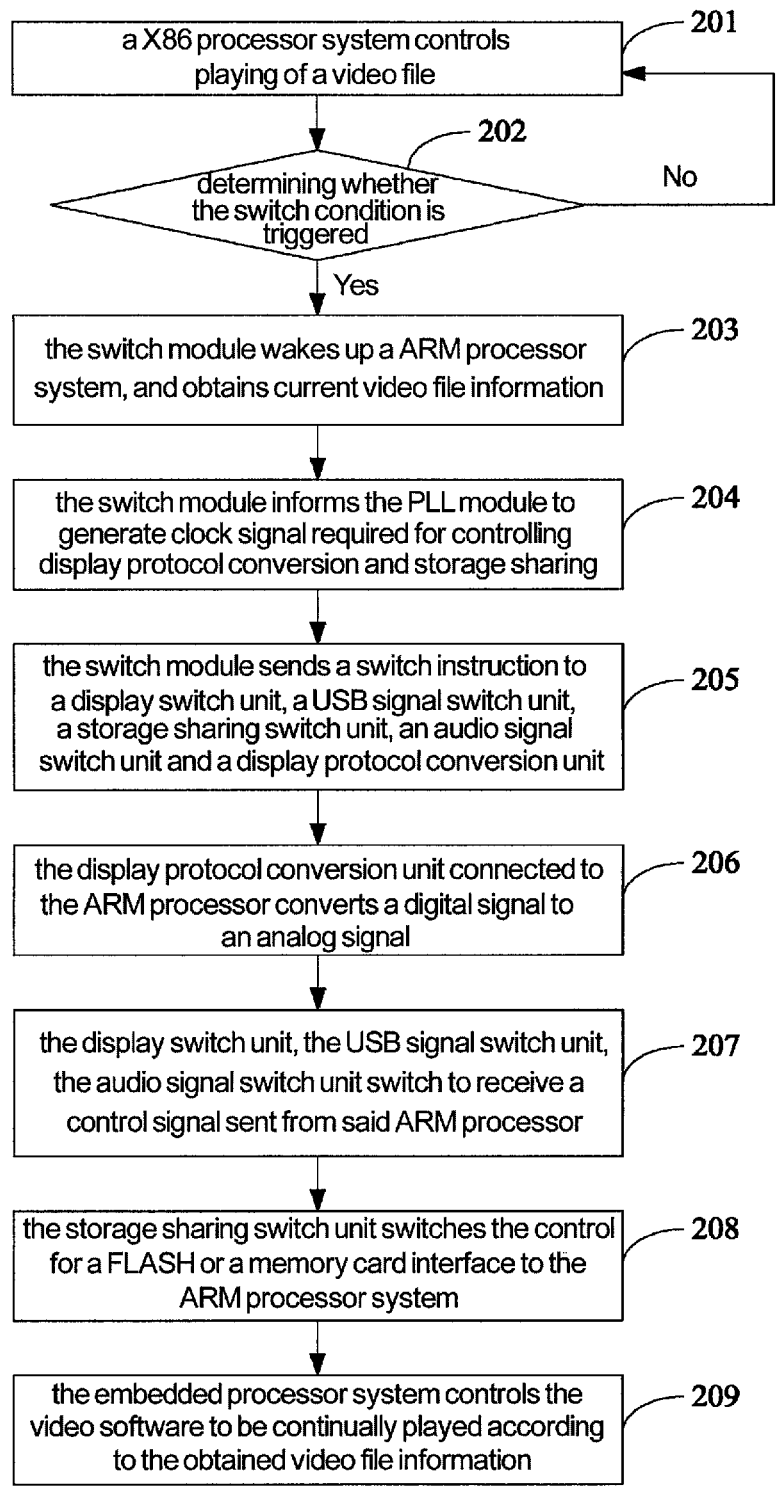
FIG. 2 is a flowchart of a method for controlling the dual-processor switch in the second embodiment of the present invention.

The flowchart of the method for controlling the dual-processor switch in the second embodiment of the present invention is as shown in FIG. 2. The embodiment shows the process of controlling the dual-processor switch by taking the play of video by the terminal as an example. The switch module inside the terminal is coupled to the X86 processor system and the embedded processor system, respectively, and is also coupled to the peripheral device of the terminal.

It is assumed that the dual processors in the terminal refer to an X86 processor and an ARM processor, respectively, wherein the X86 processor is located in an X86 processor system. The X86 processor system also comprises components such as a display card, a sound card, a north bridge, a south bridge, EC, buttons, a keyboard, a touchpad, a battery and so on, which is under the control of the X86 processor through a PC bus, while the ARM processor is located within the embedded processor system.

At step 201, the X86 processor system controls the play of the video file. When the X86 processor system plays the video file, at this time, the display switch unit, the USB signal switch unit, and the audio signal switch unit switch to receive control signals sent from the X86 processor system, and the embedded processor may be in the sleep state.

At step 202, it may be determined whether the switch condition is triggered. If so, proceed to step 203; if not, return to step 201.

The triggering of the switch condition may include, for example, pressing the special button on the terminal by the user, the power level of the battery lower than 10%, or triggered by the user through a specific application software.

At step 203, the switch module wakes up the ARM processor system, and obtains the current information on the video file.

A switch logic control unit may be set within the switch module. The EC of the X86 processor system sends a message informing the switch to the switch logic control unit of the switch module through an I²C interface or a serial interface. The switch logic control unit wakes up the ARM processor through the SPI interface, and sends the obtained current information on the video file to the embedded processor end, and waits the embedded processor end to play the video file.

At step 204, the switch module informs the Phase Locked Loop (PLL) unit to generate a clock signal required for controlling display protocol conversion and storage sharing.

The switch logic control unit sends a control message to the PLL unit to enable it to operate and generate the clock signal required for controlling display protocol conversion and storage sharing.

At step 205, the switch module sends a switch instruction to the display switch unit, the USB signal switch unit, the storage sharing switch unit, the audio signal switch unit and the display protocol conversion unit.

At step 206, the display protocol conversion unit coupled to the ARM processor converts a digital signal into an analog signal. The function of the display protocol conversion unit is to convert a RGB digital display signal outputted from the digital embedded processor into an analog signal of DISPLAYPORT or LVDS (Low Voltage Differential Signal) in order to support the output to the display screen.

At step 207, the display switch unit, the USB signal switch unit, and the audio signal switch unit switch to receive the control signal sent from the ARM processor. The display switch unit switches the signal outputted from the X86 processor system and the LVDS signal or DISPLAYPORT signal generated by the display protocol conversion unit. When the X86 processor system is playing a video file, the output of the display switch unit is the signal of the display card of the X86 processor system. When the X86 processor system goes into the sleep/standby/turn off state, the output of the display switch unit is the display signal of the embedded processor end. It should be noted that the X86 processor system of the embodiment of the invention may be embodied as a PC system.

The USB signal switch unit switches a USB signal outputted from the south bridge of the X86 processor system and a USB signal of the embedded processor end. When the X86 processor system is playing a video file, the output of the USB signal switch unit is the USB signal of the X86 processor system. When X86 processor system goes into the sleep/standby/turn off state, the output of the USB signal switch unit is the USB signal of the embedded processor end. The outputted signal is used to connect the peripheral device of the USB interface, such as a camera, a Bluetooth, a wireless network card, a memory disk and others.

The audio signal switch unit switches an analog audio signal inputted/outputted from the sound card of the X86 processor system and an analog audio signals inputted/outputted from the embedded processor end. The switched output signal is used to connect the peripheral device such as a speaker, an earphone, a microphone and others.

At step 208, the storage sharing switch unit switches the control for the flash memory or the memory card interface to the ARM processor system. The storage sharing switch unit enables both the X86 processor system and the embedded processor end to access the flash memory storage space for the united management of data, and reduce the time for synchronizing data between the X86 processor system and the embedded processor end. Due to the storage profile of the flash memory, when the X86 processor system goes into the sleep/standby/turn off state, it can no longer access the hard disk, thereby conserving the power consumption of the terminal.

At step 209, the embedded processor system controls the video software to be continually played according to obtained information on the video file, and ends the current procedure.

Figure 3:
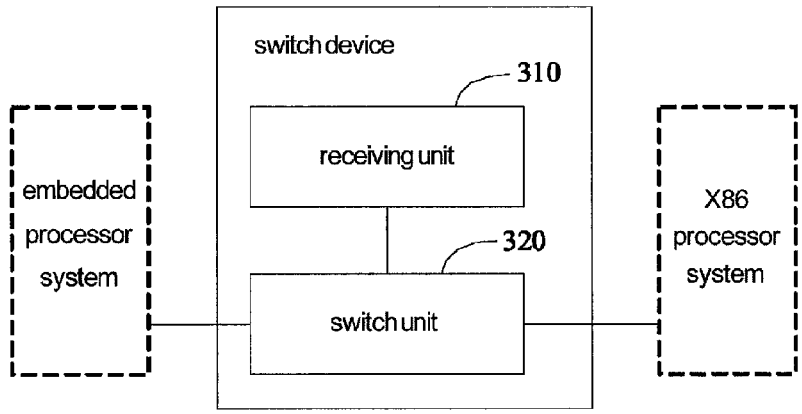
FIG. 3 is a block diagram of a device for controlling the dual-processor switch in the first embodiment of the present invention.

FIG. 3 illustrates a block diagram of the device for controlling the dual-processor switch in the first embodiment of the present invention. The device is applicable to a terminal including an X86 processor system and an embedded processor system, wherein the X86 processor system, the embedded processor system and the device are respectively set. The device may be embodied as a chip. The switch device is coupled to a peripheral device of the terminal. The device comprises a receiving unit 310 and a switch unit 320.

The receiving unit 310 is for receiving a triggering signal for switching to the embedded processor system when the switch unit is controlling the peripheral device by receiving a control signal from the X86 processor system. The switch unit 320 is for waking up the embedded processor system, and switching to receive a control signal sent from the embedded processor system, and controlling the peripheral device by using the control signal from the embedded processor system.

The switch unit 320 may include (not shown in FIG. 3): an interface unit, configured for sending a wake-up signal through a SPI interface to the embedded processor system; a configure unit configured for obtaining the current application data of the terminal; a clock unit configured for generating a clock signal required for controlling display protocol conversion and storage sharing; a display switch unit coupled to a display module, configured for receiving a display control signal sent by the X86 processor system through the display card and controlling the display module, and switching to receive a display control signal which has been display-protocol-converted sent from the embedded processor system; a USB signal switch unit coupled to a USB peripheral device, configured for receiving a USB control signal sent by the X86 processor system through a south bridge and controlling the USB peripheral device, and switching to receive a USB control signal sent from the embedded processor system; a storage sharing switch unit coupled to a FLASH or a memory card interface, configured for receiving a storage control signal sent by the X86 processor system through the south bridge and controlling the FLASH or the memory card interface, and switching to receive a storage control signal sent from the embedded processor system; and an audio signal switch unit coupled to an audio device, configured for receiving an audio control signal sent by the X86 processor system through a sound card and controlling the audio device, and switching to receive an audio control signal sent from the embedded processor system.

Figure 4:
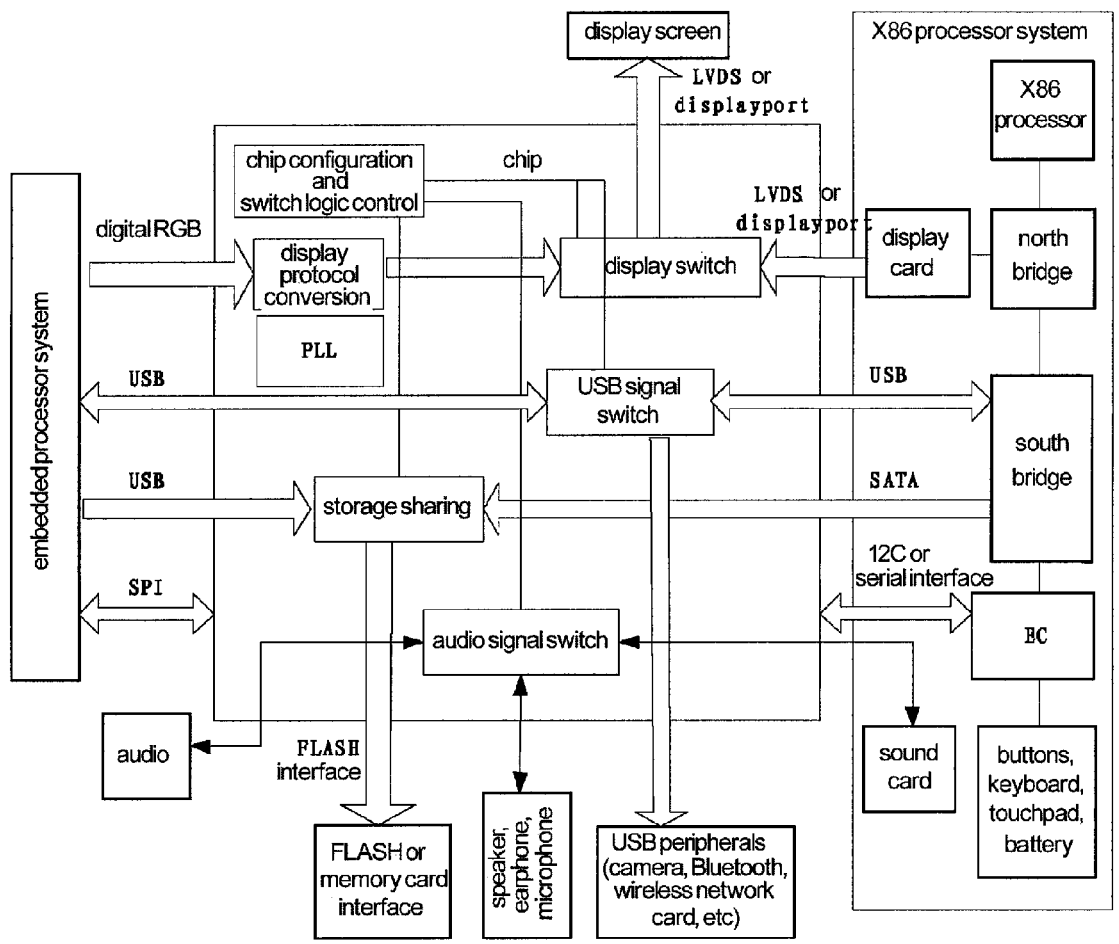
FIG. 4 is a structure diagram of one application example of the device for controlling dual-processor switch of the present invention.

When the device shown in FIG. 3 is a chip, the chip is set within the terminal, and the dual-processor of the terminal is controlled by the chip. The structure schematic diagram of the terminal is as shown in FIG. 4.

The chip is coupled to the X86 processor system and the embedded processor end, respectively. The chip comprises a chip configuration and switch logic control module, a display protocol conversion module, a display switch module, a PLL module, a USB signal switch module, a storage sharing switch module and an audio signal switch module. The display switch module is coupled to a display screen, the USB signal switch module is coupled to a USB peripheral, the storage sharing switch module is coupled to a flash memory or a memory card interface, and the audio signal switch module is coupled to an audio device such as a speaker, an earphone or a microphone and so on. The functions of each module are illustrated below, respectively:

The function of the display protocol conversion module is to convert a display signal of digital RGB into a DISPLAYPORT (or LVDS) signal in order to support the output of the display.

The function of the storage sharing switch module is to enable both the X86 processor system and the embedded processor end to access the storage space of the flash memory for the united management of data, and saves the time for synchronizing data from the computer to the embedded processor end. Due to the storage profile of flash memory, when the X86 processor system goes into the sleep/standby/turn off state, it no longer needs to access the hard disk, thereby achieving the purpose of saving the power consumption of the terminal.

The function of the chip configuration and switch logic module is to receive a control command from the X86 processor system EC and the embedded processor end, and perform logic control for display switch, USB signal switch, analog signal switch, storage sharing switch, and is responsible for the internal power control of each module. When the embedded processor end does not need signals at some time, for example when playing audio, if USB signal switch is not required, it can perform a low power consumption process for these parts of the circuits to save the power consumption of the terminal.

The function of the PLL module is to generate a clock multiple frequency, and to maintain a precise frequency multiple relationship and phase relationship between the outputted clock and the original clock. With respect to an integrated circuit in the present invention, for example, it provides the clock required for DISPLAYPORT inside the display protocol conversion and for USB of storage sharing.

The function of the display switch module is to switch the signal outputted from the display card of the X86 processor system and the LVDS or DISPLAYPORT signal generated by the display protocol conversion. When the X86 processor system is working, the output of the module is the signal of the display card of the X86 processor system. When X86 processor system goes into the sleep/standby/turn off state, the output of the module is the display signal of the embedded processor end.

The function of the USB signal switch module is to switch the USB signal outputted from the south bridge of the X86 processor system and the USB signal of the embedded processor end. When the X86 processor system is working, the output of the module is the USB signal of the X86 processor system. When the X86 processor system goes into the sleep/standby/turn off state, the output of the module is the USB signal of the embedded processor end. The outputted USB signal is used to connect the peripheral device of the USB interface, such as a camera, a Bluetooth, a wireless network card, a memory disk and others, as shown in the figure.

The function of the audio signal switch module is to switch the analog audio signal inputted/outputted from the sound card of the X86 processor system and the analog audio signal inputted/outputted from the embedded processor end. The switched output is coupled to the peripheral device such as a speaker, an earphone, a microphone and so on.

Figure 5:
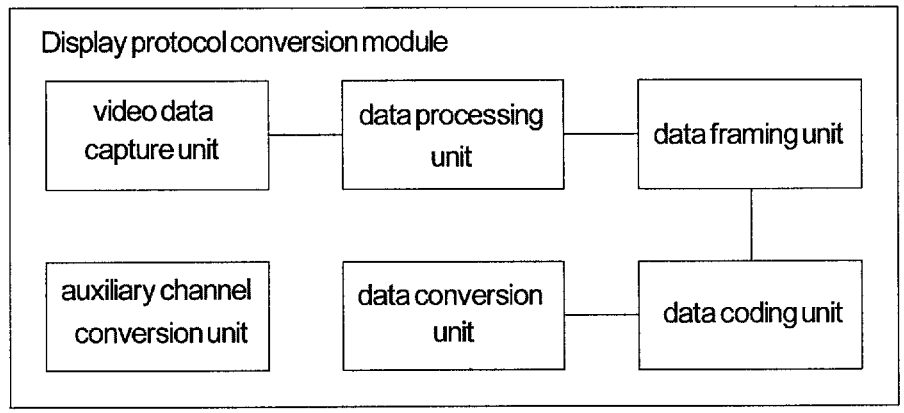
FIG. 5 is an illustrative diagram of the structure of the display protocol conversion module shown in FIG. 4.

FIG. 5 illustrates the detailed structure of the display protocol conversion module. The display protocol conversion module may include a video data capture unit, a data processing unit, a data framing unit, a data coding unit, and a data conversion unit.

The video data capture unit is responsible for capturing an 18-bit display data in parallel of the port, and may modify the parameters according to the chip configuration and the set of the switch logic. The function of the data processing unit is to perform a tensile process for the image data. For example, the display resolution typically supported by the display output of the embedded processor is 1280×800 at most, while the display resolution supported by the X86 processor system typically is above 1400×900. Interpolation process is performed to the data to meet the higher resolution. Otherwise, it is unable to input to the display screen (practically, the display screen of the notebook computer) normally. The function of the data framing unit is to rearrange the data according to the signal frame format of DISPLAYPORT or LVDS required by the display screen. The function of the data coding unit is to perform 8 BIT/10 BIT coding to the framed data. The function of the data conversion unit is to support DISPLAYPORT analog signal conversion, to ensure the front end to implement the data transmission of each bit with the lowest power consumption and the highest efficiency. The function of an auxiliary channel conversion unit is to convert a command of the chip configuration and switch logic into data of the DISPLAYPORT auxiliary channel.

Figure 6:
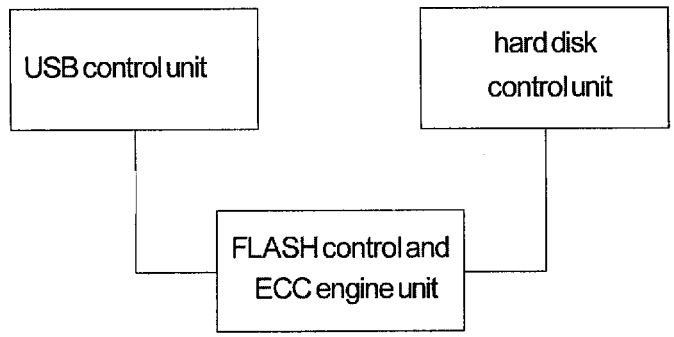
FIG. 6 is a schematic diagram of the structure of the storage sharing module as shown in FIG. 4.

FIG. 6 illustrates the detailed structure of the storage sharing module. The storage sharing module may include a USB controller unit, a hard disk controller unit, a flash memory control and ECC (Error Checking and Correcting) engine unit. The storage sharing module enables the X86 processor system and the embedded processor system to access the module simultaneously so as to increase the access speed of the data in the terminal.

The hard disk controller unit provides SATA (Serial Advanced Technology Attachment) interface protocol of the X86 processor system, and ensures the compatibility of the input data of the X86 processor system. The USB controller unit provides the USB interface protocol of the embedded processor end, and ensures the compatibility of the input data of the embedded processor end. The flash memory control and ECC engine unit provides the read/write control logic of the external flash memory chip and the memory card and ECC checking, and ensures the reliability of long time read/write of flash memory data.

Figure 7:
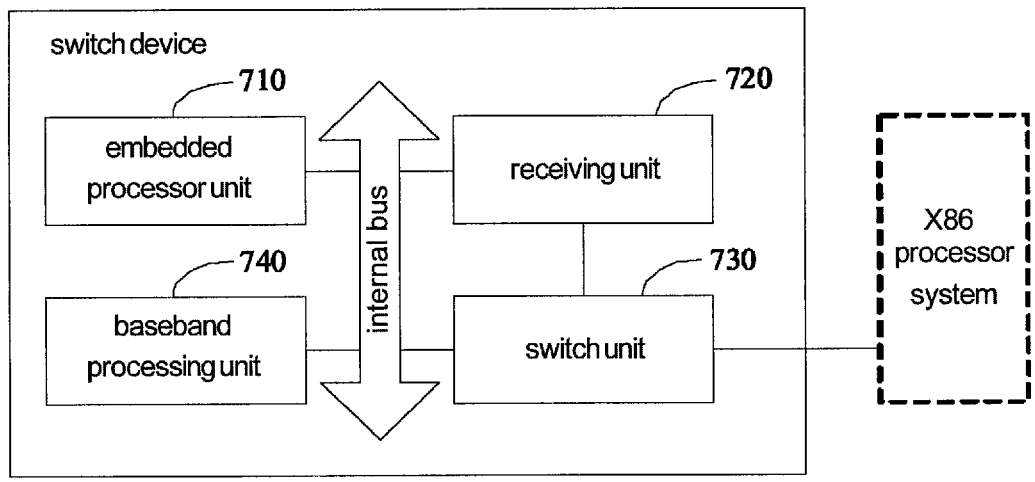
FIG. 7 is a block diagram of a device for controlling the dual-processor switch in the second embodiment of the present invention.

FIG. 7 is a block diagram of the device for controlling dual-processor switch of the second embodiment of the present invention, wherein the device is applicable to a terminal including an X86 processor system and an embedded processor system. The embedded processor system is integrated into the device, which may be embodied as a chip. The switch device is coupled to a peripheral device of the terminal. The device may include an embedded processor unit 710, a receiving unit 720 and a switch unit 730.

The embedded processor unit 710 is coupled to the switch unit 730 through an internal bus. The receiving unit 720 is for receiving a triggering signal for switching to the embedded processor 710, when the switch unit is controlling the peripheral device by receiving a control signal from the X86 processor. The switch unit 730 is for waking up the embedded processor, and switching to receive a control signal sent from the embedded processor 710, and controlling the peripheral device by using the control signal from the embedded processor 710.

Furthermore, the device can also include a base band processing unit 740 coupled to the internal bus for performing encoding and decoding to the wireless communication channel, and performing wireless communication with an antenna through a Radio Frequency unit coupled to the base band processing unit. The switch unit 730 may include (not shown in FIG. 7): an interface unit, configured for sending a wake-up signal through a SPI interface to the embedded processor; a configure unit, configured for obtaining the current application data of the terminal; a clock unit, configured for generating a clock signal required for controlling display protocol conversion and storage sharing; a display switch unit coupled to a display module, configured for receiving a display control signal sent by the X86 processor through the display card and controlling the display module, and switching to receive a display control signal which has been display-protocol-converted sent from the embedded processor; a USB signal switch unit coupled to a USB peripheral device, configured for receiving a USB control signal sent by the X86 processor through a south bridge and controlling the USB peripheral device, and switching to receive a USB control signal sent from the embedded processor; a storage sharing switch unit coupled to a FLASH or a memory card interface, configured for receiving a storage control signal sent by the X86 processor system through the south bridge and controlling the FLASH or the memory card interface, and switching to receive a storage control signal sent from the embedded processor; and an audio signal switch unit coupled to an audio device, configured for receiving an audio control signal sent by the X86 processor system through a sound card and controlling the audio device, and switching to receive an audio control signal sent from the embedded processor.

Figure 8:
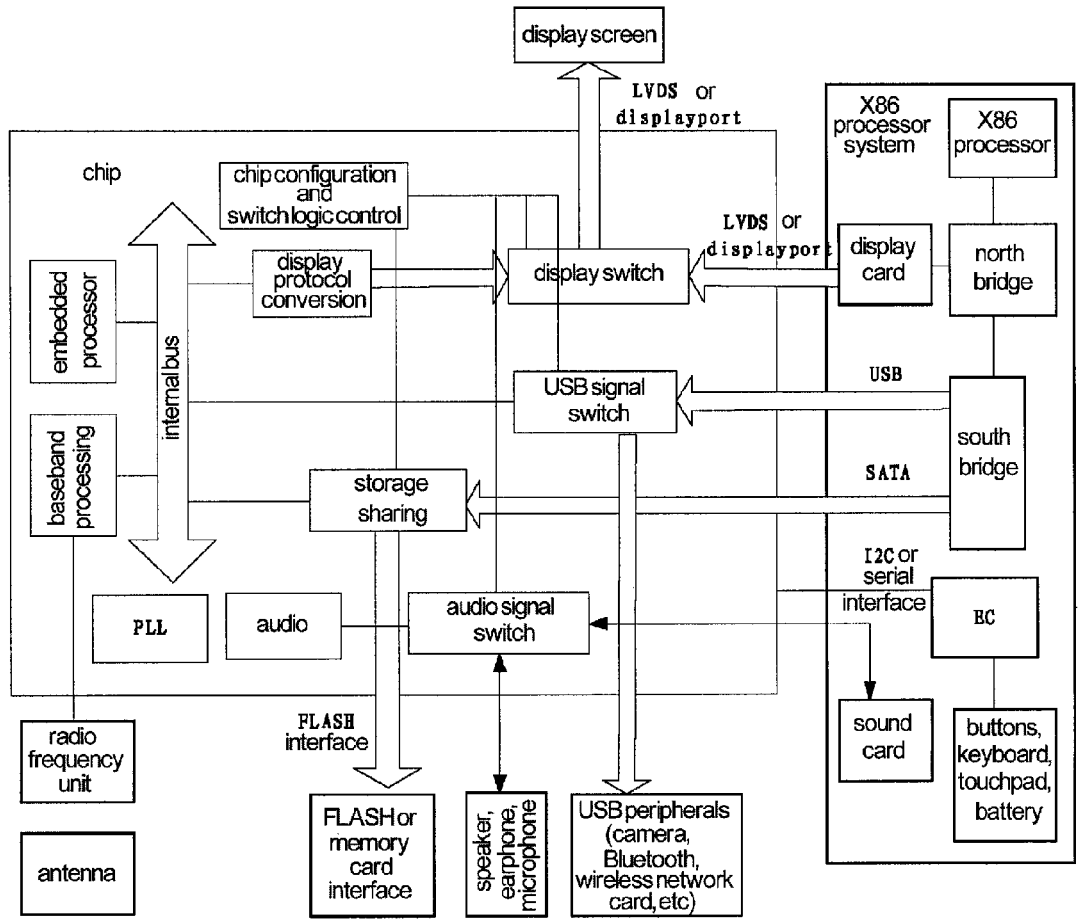
FIG. 8 is a structure diagram of alternative application example of the device for controlling the dual-processor switch of the present invention.

When the device as illustrated in FIG. 7 is a chip (or integrated circuit), the switch function and the embedded processor system are integrated into the chip. The schematic diagram of the structure of the terminal is as shown in FIG. 8.

The chip, integrated with the function of the embedded processor system, is coupled to the X86 processor system. The integrated circuit comprises a chip configuration and switch logic control module, a display protocol conversion module, a display switch module, a PLL module, a USB signal switch module, a storage sharing module, an audio signal switch module, and a baseband processing module. The display switch module is coupled to a display screen, the USB signal switch module is coupled to a USB peripheral, the storage sharing module is coupled to a flash memory or a memory card interface, the audio signal switch module is coupled to an audio device such as a speaker, an earphone or a microphone and so on. The aforementioned modules and the baseband processing module and the embedded processor are all coupled to an internal bus within the chip. The function of the display protocol conversion module is to convert a display signal of digital RGB into a DISPLAYPORT (or LVDS) signals, in order to support the output of the display.

The function of the storage sharing module is to enable both the X86 processor system and the embedded processor end to access the flash memory storage space for the united management of data, and saves the duration time for synchronizing data from the computer to the embedded processor end. Due to the storage profile of the flash memory, when the X86 processor system goes into the sleep/standby/turn off state, it no longer needs to access the hard disk, achieving the purpose of saving the power consumption of the terminal.

The functions of the chip configuration and switch logic module are to receive a control command from the X86 processor system EC and the embedded processor side, and perform logic control for display switch, USB signal switch, analog signal switch, storage sharing switch, and are responsible for internal power control of each module. When the embedded processor end does not need a signal at some time, for example, when playing audio, if the USB signal switch is not required, a low power consumption process for these parts of the circuits may be performed to save the power consumption of the terminal.

The function of the PLL module is to generate a clock multiple frequency, and to maintain a precise frequency multiple relationship and phase relationship between the outputted clock and the original clock. With respect to the integrated circuit in the present invention, for example, it provides the clock required for the DISPLAYPORT inside the display protocol conversion and for USB of storage sharing.

The function of the display switch module is to switch a signal outputted from the display card of the X86 processor system and a LVDS or DISPLAYPORT signal generated by the display protocol conversion. When the X86 processor system is working, the output of the module is the signal of the display card of the X86 processor system. When X86 processor system goes into the sleep/standby/turn off state, the output of the module is the display signal of the embedded processor end.

The function of the USB signal switch module is to switch the USB signal outputted from the south bridge of the X86 processor system and the USB signal of the embedded processor end. When the X86 processor system is working, the output of the module is the USB signal of the X86 processor system. When the X86 processor system goes into the sleep/standby/turn off state, the output of the module is the USB signal of the embedded processor end. The outputted USB signal is used to connect the peripheral device of the USB interface, such as a camera, a Bluetooth, a wireless network card, a memory disk and others, as shown in the figure.

The function of the audio signal switch module is to switch the analog audio signal inputted/outputted from the sound card of the X86 processor system and the analog audio signal inputted/outputted from the embedded processor end. The switched output is coupled the peripheral device such as a speaker, an earphone, a microphone and so on.

One main function of the baseband processing module is to perform encoding and decoding to the wireless communication channel. The module supports protocols such as WCDMA□ HSDPA□ HSUPA□ GSM□ GPRS□ EDGE□

IS-95A/B□ 1X□ 1×EV-DO and so on, and consists a wireless communication part through a coupled radio frequency unit and an antenna.

The function of the internal bus is to perform high speed exchange of the internal data, for example, the data exchange between the embedded processor and the baseband processing module, and the data exchange between USB signal switch module and the baseband processing module, etc. When X86 processor system is normally working, the embedded processor of the chip can goes into sleep, while the internal bus and the baseband processing module can maintain the working state, at this time the USB connection of the X86 processor system can communicate with the baseband processing module via the internal bus. The chip, the radio frequency unit and the antenna can serve as the wireless communication module of the X86 processor system, such as a 3G network card. When the X86 processor system enters into the sleep/standby/turn off state, the embedded processor system inside the chip can access the baseband processing module, the radio frequency unit and the antenna, perform wireless communication and surf the network.

Figure 9:
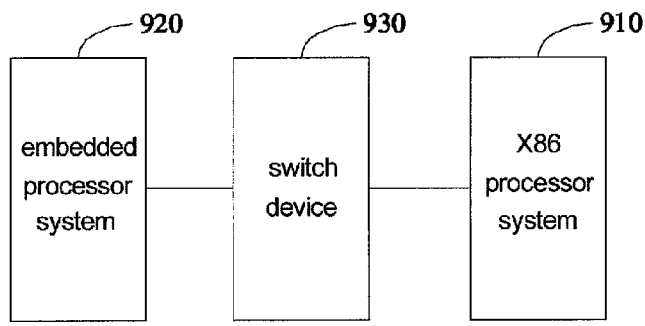
FIG. 9 is a block diagram of an embodiment of the terminal of the present invention.

The block diagram of the terminal of the embodiment of the invention is as shown in FIG. 9. The terminal includes an X86 processor system 910, an embedded processor system 920 and a switch device 930. The switch device is coupled to a peripheral device of the terminal.

When receiving a control signal from the X86 processor system 910 for controlling the peripheral device, the switch device 930 receives a triggering signal for switching to the embedded processor system 920, wakes up the embedded processor system 920, and switches to receive a control signal sent from the embedded processor system 920, and controls the peripheral device by using the control signal from the embedded processor system 920.

The embedded processor system 920 may be set separately from the switch device 930. Alternatively, the embedded processor system 920 may also be integrated into the switch device 930, and is coupled to the switch device 930 via an internal bus. Furthermore, the switch device 930 may also be used to perform encoding and decoding to the wireless communication channel through the baseband processing unit, and may perform wireless communication through the radio frequency unit and the antenna that is coupled to the baseband processing unit.

It should be noted that the present invention may be applicable to terminals such as a cellphone, a PDA or a notebook computer which have dual processors. According to the description of the above implementations, the terminal of the embodiment of the present invention comprises an X86 processor system, an embedded processor system and a switch module connecting the X86 processor system with the embedded processor system. The switch module is coupled to a peripheral device of the terminal. When the switch module is controlling the peripheral device by receiving a control signal from the X86 processor system, the switch module receives a triggering signal for switching to the embedded processor system. The switch module wakes up the embedded processor system, switches to receive a control signal sent from the embedded processor system, and controls the peripheral device by using the control signal from the embedded processor system. One embodiment of the invention enables the embedded processor system to control the peripheral device of the terminal individually through the switch module. Therefore, the embedded processor system may accomplish specific applications of the terminal without starting up the X86 processor system, thereby saving the power consumption of the terminal. Furthermore, the switch control function of the terminal may be integrated into the switch module, which saves the design cost and number of the devices of the terminal.

One skilled in the art can appreciate that the present invention may be embodied in a manner by using software plus necessary general purpose hardware platform. Based on such understanding, the solution of the present invention naturally may be embodied in a manner of software product, at least to the part making contribution to the prior art. The computer software product may be stored in a storage medium, such as a ROM/RAM, a magnetic disk, an optical disk, etc, and include several instructions for enabling a computer device (a personal computer, a server, or a network device, etc) to execute the method of each embodiment of the invention or some part of the embodiments.

The aforementioned embodiments of the present invention do not limit the scope of the present invention sought for protection. Any modifications, equivalent replacement and improvement made within the spirit and principle of the present invention all fall into the scope of the present invention sought for protection.

What is claimed is:

1. A method for controlling a dual-processor switch, applicable to a terminal having a processor system and an embedded processor system, the terminal including a switch module coupled to the processor system and the embedded processor system, the switch module being coupled to a peripheral device of the terminal, the method comprising:
   receiving a triggering signal by the switch module for switching to the embedded processor system, when the switch module is controlling the peripheral device by receiving a control signal from the processor system;
   waking a the embedded processor system by the switch module, and switching to receive a control signal sent from the embedded processor system; and
   controlling the peripheral device by using the control signal from the embedded processor system,
   wherein,
   (1) the switch module comprises:
      (i) a display switch unit coupled to a display module,
      (ii) a USB signal switch unit coupled to a USB peripheral device,
      (iii) a storage sharing switch unit coupled to a FLASH or a memory card interface, and
      (iv) an audio signal switch unit coupled to an audio device, and
   (2) the switch module receiving the triggering signal to switch to the embedded processor system comprises:
      (i) when a switch button on the terminal is pressed, the switch module receiving the triggering signal to switch to the embedded processor system, which corresponds to the switch button,
      (ii) when the processor system is in a sleep state or a standby state, the switch module receiving the triggering signal to control the peripheral device through the embedded processor system,
      (iii) when the power level of the terminal is lower than a threshold value, the switch module receiving the triggering signal to switch to the embedded processor system, and
      (iv) when the terminal starts up a specific application software, the switch module receiving the triggering signal to switch to the embedded processor system.

2. A method for controlling a dual-processor switch, applicable to a terminal having a processor system and an embedded processor system, the terminal including a switch module coupled to the processor system and the embedded processor system, the switch module being coupled to a peripheral device of the terminal, the method comprising:
- receiving a triggering signal by the switch module for switching to the embedded processor system, when the switch module is controlling the peripheral device by receiving a control signal from the processor system;
- waking a the embedded processor system by the switch module, and switching to receive a control signal sent from the embedded processor system; and
- controlling the peripheral device by using the control signal from the embedded processor system, wherein,
- (1) the switch module comprises:
  - (i) a display switch unit coupled to a display module,
  - (ii) a USB signal switch unit coupled to a USB peripheral device,
  - (iii) a storage sharing switch unit coupled to a FLASH or a memory card interface, and
  - (iv) an audio signal switch unit coupled to an audio device, and
- (2) the switch module waking up the embedded processor system comprises:
  - (i) the switch module sending a wake-up signal through a SPI interface to the embedded processor system, and
  - (ii) the switch module obtaining a current application data of the terminal, and generating a clock signal required for controlling display protocol conversion and storage sharing.

3. A method for controlling a dual-processor switch, applicable to a terminal having a processor system and an embedded processor s stem the terminal including a switch module coupled to the processor system and the embedded processor system, the switch module being coupled to a peripheral device of the terminal, the method comprising:
- receiving a triggering signal by the switch module for switching to the embedded processor system, when the switch module is controlling the peripheral device by receiving a control signal from the processor system;
- waking a the embedded processor system by the switch module, and switching to receive a control signal sent from the embedded processor system; and
- controlling the peripheral device by using the control signal from the embedded processor system, wherein,
- (1) the switch module comprises:
  - (i) a display switch unit coupled to a display module,
  - (ii) a USB signal switch unit coupled to a USB peripheral device,
  - (iii) a storage sharing switch unit coupled to a FLASH or a memory card interface, and
  - (iv) an audio signal switch unit coupled to an audio device, and
- (2) switching to receive the control signal sent from the embedded processor system comprises at least any one of the following:
  - (i) the display switch unit switching to receive a display control signal that has been display-protocol-converted and sent from the embedded processor system,
  - (ii) the USB signal switch unit switching to receive a USB control signal sent from the embedded processor system,
  - (iii) the storage sharing switch unit switching to receive a storage control signal sent from the embedded processor system, and
  - (iv) the audio signal switch unit switching to receive an audio control signal sent from the embedded processor system.

4. A method for controlling a dual-processor switch, applicable to a terminal having a processor system and an embedded processor system, the terminal including a switch device coupled to the processor system and the embedded processor system, the switch device being coupled to a peripheral device of the terminal, the method comprising:
- receiving a triggering signal by the switch device for switching to the embedded processor system, when the switch device is controlling the peripheral device by receiving a control signal from the processor system;
- waking a the embedded processor system by the switch device, and switching to receive a control signal sent from the embedded processor system; and
- controlling the peripheral device by using the control signal from the embedded processor system, wherein,
- the embedded processor system (i) is set separately from the switch device, or (ii) the embedded processor system is integrated into the switch device and is coupled to the switch device via an internal bus, and
- when the embedded processor system is integrated into the switch device the switch device comprises a baseband processing unit coupled to the internal bus, and the method further comprises:
  - the baseband processing unit performing encoding and decoding to a wireless communication channel, and performing wireless communication through a radio frequency unit and an antenna coupled to the baseband processing unit.

5. A switch device for controlling a dual-processor switch, applicable to a terminal including a processor system and an embedded processor system, the switch device being coupled to a peripheral device of the terminal, the switch device comprising:
- a receiving unit, configured for receiving a triggering signal for switching to the embedded processor system, when a switch unit is controlling the peripheral device by receiving a control signal from the processor system; and
- the switch unit, configured for waking up the embedded processor system, and switching to receive a control signal sent from the embedded processor system, and for controlling the peripheral device by using the control signal from the embedded processor system, wherein,
- the switch unit comprises:
  - (i) an interface unit, configured for sending a wake-up signal through a SPI interface to the embedded processor system,
  - (ii) a configuration unit, configured for obtaining the current application data of the terminal,
  - (iii) a clock unit, configured for generating a clock signal required for controlling display protocol conversion and storage sharing,
  - (iv) a display switch unit coupled to a display module, configured for switching to receive a display control signal which has been display-protocol-converted, sent from the embedded processor system,
  - (v) a USB signal switch unit coupled to a USB peripheral device, configured for switching to receive a USB control signal sent from the embedded processor system,
  - (vi) a storage sharing switch unit coupled to a FLASH or a memory card interface, configured for switching to receive a storage control signal sent from the embedded processor system, and (vii) an audio signal switch unit coupled to an audio device, configured for switching to receive an audio control signal sent from the embedded processor system.

6. A switch device for controlling a dual-processor switch, applicable to a terminal including a processor system and an embedded processor system, the switch device being coupled to a peripheral device of the terminal, the switch device comprising:

a receiving unit, configured for receiving a triggering signal for switching to the embedded processor system, when a switch unit is controlling the peripheral device by receiving a control signal from the processor system; and the switch unit, configured for waking up the embedded processor system, and switching to receive a control signal sent from the embedded processor system, and for controlling the peripheral device by using the control signal from the embedded processor system, wherein, the embedded processor system (i) is set separately from the switch device, or (ii) the embedded processor system is integrated into the switch device and is coupled to the switch device via an internal bus, and when the embedded processor system is integrated into the switch device, the switch device further comprises a baseband processing unit coupled to the internal bus for performing encoding and decoding to a wireless communication channel, and performing wireless communication through a radio frequency unit and an antenna coupled to the baseband processing unit.

7. A terminal, comprising:

a processor system;

an embedded processor system; and a switch device coupled to a peripheral device of the terminal, the switch device being configured for (i) receiving a triggering signal for switching to the embedded processor system, when the switch device is controlling the peripheral device by receiving a control signal from the processor system, (ii) waking up the embedded processor system, and switching to receive a control signal sent from the embedded processor system, and (iii) controlling the peripheral device by using the control signal from the embedded processor system, wherein, the embedded processor system (i) is set separately from the switch device, or (ii) the embedded processor system is integrated into the switch device and is coupled to the switch device via an internal bus, and the switch device is further configured for performing encoding and decoding to a wireless communication channel through a baseband processing unit, and performing wireless communication through a radio frequency unit and an antenna coupled to the baseband processing unit.

* * * * *

UNITED STATES PATENT AND TRADEMARK OFFICE
CERTIFICATE OF CORRECTION

PATENT NO. : 8,886,968 B2
APPLICATION NO. : 13/148654
DATED : November 11, 2014
INVENTOR(S) : Hao Chen and Haifang Tan It is certified that error appears in the above-identified patent and that said Letters Patent is hereby corrected as shown below:

On the Title Page of the Patent, Item (30), please correct the typographical error in the Foreign Priority Application Number from "CN 200910084526" to "(CN) 200910084526.1"

Signed and Sealed this
Seventeenth Day of February, 2015

Michelle K. Lee
*Deputy Director of the United States Patent and Trademark Office*